United States Patent [19]
Suda

[11] Patent Number: 5,701,339
[45] Date of Patent: Dec. 23, 1997

[54] DIAL-LESS CALLING DEVICE

[75] Inventor: Minoru Suda, Tokyo, Japan

[73] Assignee: Kokusai Denshin Denwa Kabushiki Kaisha, Japan

[21] Appl. No.: 542,355

[22] Filed: Oct. 12, 1995

[30] Foreign Application Priority Data

Mar. 30, 1995 [JP] Japan .................................. 7-095908

[51] Int. Cl.$^6$ .................................................. H04M 1/64
[52] U.S. Cl. ........................... 379/88; 379/67; 379/199; 379/357
[58] Field of Search ........................... 379/67, 88, 89, 379/355, 357, 359, 360, 261, 199

[56] References Cited

U.S. PATENT DOCUMENTS

| | | | |
|---|---|---|---|
| 4,759,056 | 7/1988 | Akiyama | 379/357 |
| 4,817,136 | 3/1989 | Rhoads | 379/357 |
| 4,827,500 | 5/1989 | Binkerd et al. | 379/88 |
| 4,868,849 | 9/1989 | Tamaoki | 379/355 |
| 5,165,095 | 11/1992 | Borcherding | 379/88 |
| 5,325,421 | 6/1994 | Hou et al. | 379/67 |
| 5,369,685 | 11/1994 | Kero | 379/88 |
| 5,479,489 | 12/1995 | O'Brien | 379/216 |

FOREIGN PATENT DOCUMENTS

| | | |
|---|---|---|
| 2 225 915 | 6/1990 | United Kingdom . |
| 2 246 491 | 1/1992 | United Kingdom . |
| 2 263 042 | 7/1993 | United Kingdom . |
| 2 264 209 | 8/1993 | United Kingdom . |

Primary Examiner—Fan Tsang
Attorney, Agent, or Firm—Westman, Chaplin & Kelly, P.A.

[57] ABSTRACT

Registered on the voice dial card, which is not shown in the drawings, are a number for accessing the dial-less calling service and a user identification number. Public telephone 1 is equipped with reader 1a that reads the card. When the card is inserted in direction p, the aforementioned access number and user identification number are read by the reader. These numbers are automatically originated from public telephone 1, and switch 3 connects the line to controller 5 according to the access number. Controller 5 judges whether the customer is eligible to receive the dial-less calling service according to the user identification number, and if it judges that the customer is eligible to receive the service, it requests the caller to speak the destination name. In the following steps, the well known voice dialing is performed. According to this invention, a user can access voice dialing service from public telephones as well as non-public telephones.

9 Claims, 7 Drawing Sheets

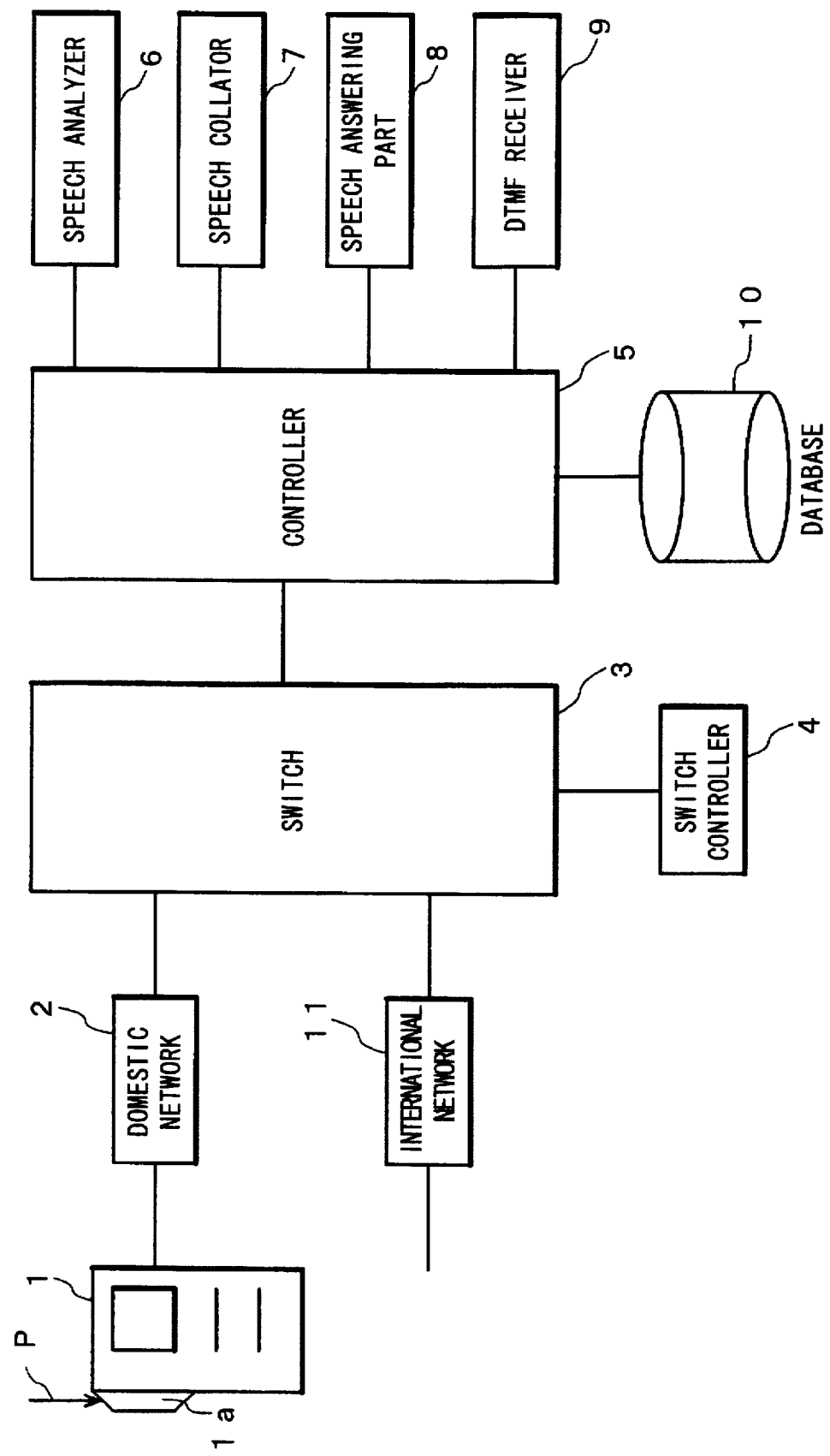

FIG. 2

| USER IDENTIFICATION NUMBER | REFERRAL/UPDATE PASSWORD | DESTINATION | |
|---|---|---|---|
| | | DESTINATION NAME | TELEPHONE NUMBER |
| 00000001 | XXXX | DAD | 03-3347-1111 |
| | | MR. KIKUTA | 03-3347-5623 |
| | | MR. INOUE | 0424-72-1111 |
| 00000002 | WWWW | MR. TAMURA | 03-3347-7326 |
| | | NTT | 03-1234-5678 |
| | | HOME | 045-222-3333 |

FIG. 3A

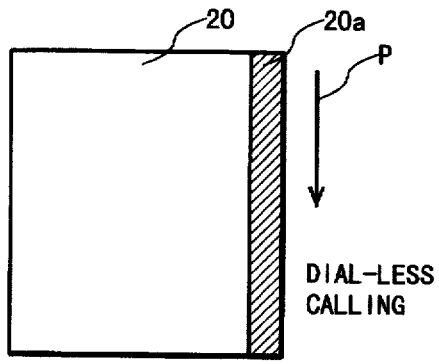

DIAL-LESS CALLING

FIG. 3B

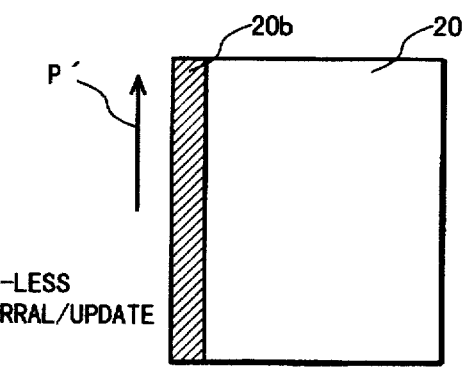

DIAL-LESS REFERRAL/UPDATE

FIG. 4

```
START
  ↓
S1: HAS THE VOICE DIAL CARD BEEN INSERTED
    INTO THE CARD READER ?
  NO → loop back
  YES ↓
S2: RECEIVE ACCESS NUMBER
  ↓
S3: DIAL-LESS CALLING NUMBER OR
    DIAL-LESS REFERRAL/UPDATE NUMBER ?
  DIAL-LESS CALLING NUMBER → (1)
  DIAL-LESS REFERRAL/UPDATE NUMBER → (2)
```

DIAL-LESS CALLING DEVICE

BACKGROUND OF THE INVENTION

1. Field of the Invention

This invention concerns a dial-less calling device, in particular a dial-less calling device that can be used to place a call and speak to the destination party without any dialing operation from a public telephone.

2. Description of the Prior Art

Since the past, voice dialing devices have been proposed where a voice recognition device is used to call the destination party without dialing the telephone number of the destination party. One such device is that disclosed under U.S. Pat. No. 5,165,095. The technology disclosed under this document is such that the caller is identified by applying a speaker-independent voice recognition unit to the dial command spoken by the caller, the speaker-dependent data required for recognizing the voice of the caller is transferred from a central database to a local telephone station, the destination identifier spoken after the aforementioned dial command is collated against the speaker-dependent data to read the destination telephone number, and this telephone number is automatically called.

According to this technology, a caller accesses a voice dialing service by dialing the telephone number of the service from a set of preregistered telephone numbers of home, work, etc., and after the line is connected to that service, the caller speaks the aforementioned dial command and the destination number in order to connect the line to the destination party without dialing the telephone number.

Consequently, the caller can place a telephone call to the destination party merely by speaking the destination identifier, without dialing the telephone number of the destination party each time that he places a call to the destination party and without the need for remembering the telephone number of the destination party.

In general, with this type of conventional technology, the decision over whether a caller is eligible to receive the aforementioned voice dialing service is made based on the caller's telephone number that is automatically sent by the telephone. Unless this decision is not made, the technology cannot eliminate abusive calls, and may cause impediment to the voice dialing service or degradation of the service.

As mentioned above, the aforementioned conventional technology identifies the caller by the caller's telephone number sent from the telephone. However, since the technology cannot identify a caller placing a call from a public telephone, the problem has been that the caller cannot receive the voice dialing service from a public telephone. Furthermore, when a caller places a call from a public telephone, the caller has typically had to hold an address book, etc., in one hand and dial the telephone with the other hand while standing, thus making the operation extremely inconvenient.

SUMMARY OF THE INVENTION

The purpose of this invention is to eliminate the problems with the conventional technology and to provide a dial-less calling device with which callers can receive the voice dialing service from both public and non-public telephones. Another purpose of this invention is to provide a dial-less calling device that allows the caller to originate calls from a public telephone with ease of operation.

To achieve the aforementioned purposes, this invention is unique in that it features a card, registered to which are no less than the access number for calling the dial-less calling service that connects the line to the destination party with only voice and the user identification number for identifying the user; a telephone that reads the aforementioned numbers registered to the card and that automatically calls the read numbers; a means of receiving the aforementioned access number and connecting the aforementioned telephone with the aforementioned dial-less calling service; a database, registered to which are the aforementioned user identification numbers, destination names, and the telephone numbers corresponding to the destination names; a means of searching a telephone number based on the aforementioned user identification number and the destination name spoken by the user; and a means of connecting the line to the destination party using the searched telephone number.

According to this invention, when the aforementioned card is inserted into the card reader on the telephone, the aforementioned access number recorded on the card is first read and is automatically originated to the switching system. If the telephone is then connected to the aforementioned dial-less calling service, the user identification number is read from the card and is sent to the switching system. Then, according to the answer requests from the switching system, the user enters by voice the destination name. Then, the dial-less calling service accesses the database and searches the telephone number according to the destination name and connects the line to the destination of the telephone number. As a result, the user can call the destination without ever dialing a number. In addition, users will also be able dial telephone numbers by voice from public telephones.

BRIEF DESCRIPTION OF THE DRAWING

FIG. 1 is a block diagram that shows an outline of the system configuration of this invention.

FIG. 2 is a conceptual diagram of the data recorded in the database.

FIGS. 3A and 3B are descriptive drawings of the data recorded on the voice dial card.

FIG. 4 is a flow chart that explains the operations of an embodiment of this invention.

DETAILED DESCRIPTION OF THE PREFERRED EMBODIMENT

Figure 5:
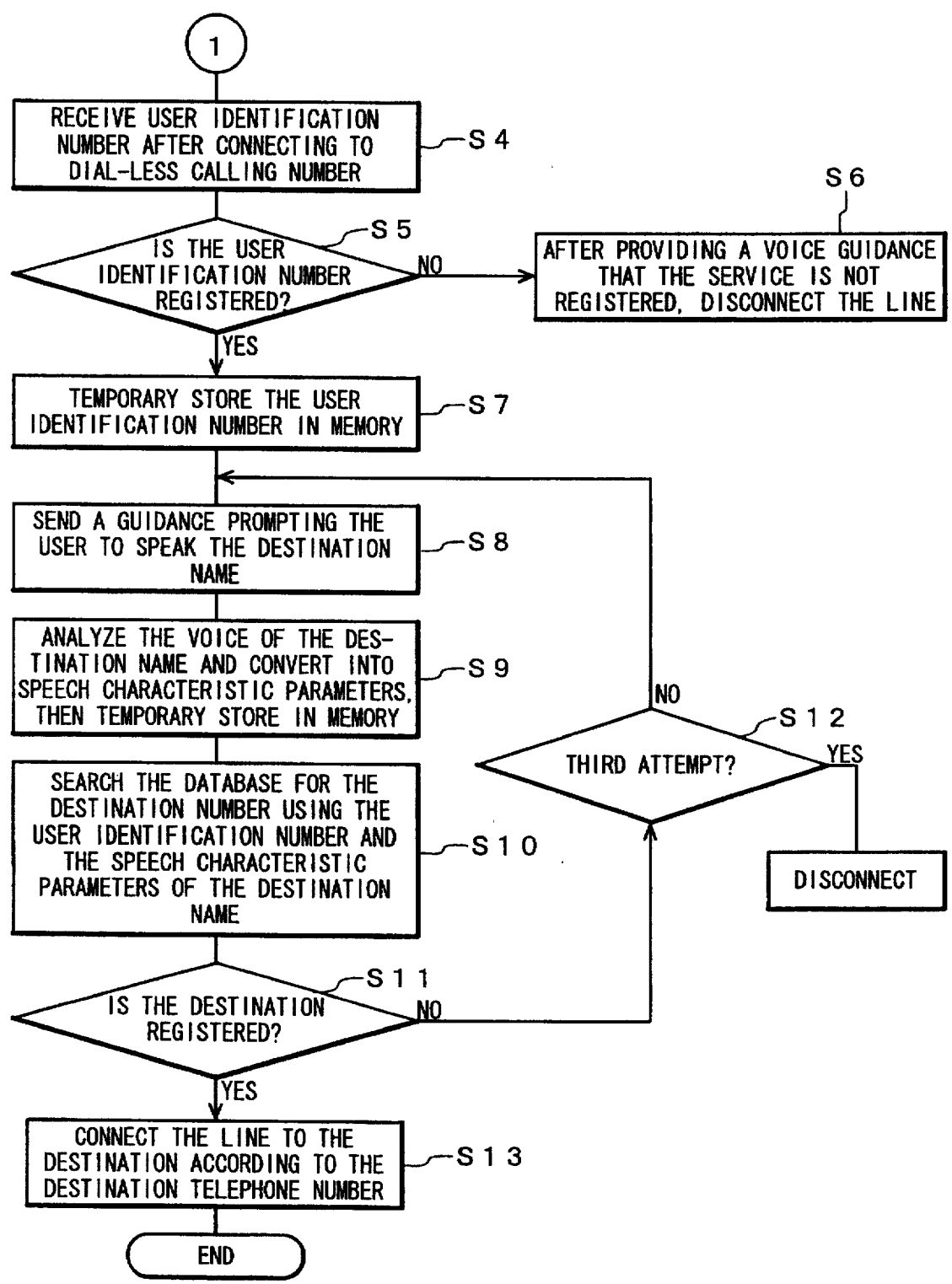
FIG. 5 is a flow chart that explains the dial-less calling operation.

The invention is described in detail by referring to the drawings. The general configuration of the international telephone communications system to which this invention is applied is described by referring to FIG. 1.

In the drawing, public telephone 1 is a widely recognized telephone with a card reading function that has been installed since the past. Public telephone 1 is equipped with card reader 1a. When a card is, for example, inserted in the direction p in the drawing, card reader 1a can read the contents recorded on the end of the card. Domestic network 2 is a network to which public telephone 1 is connected, and domestic network 2 is connected to switch 3 of the switch of the international switching system. Switch controller 4 controls the operations of switch 3. Based on commands from switch controller 4, switch 3 performs such controls as connection and disconnection of lines between domestic network 2 and international network 11 and performs such controls as connection of the aforementioned line to the voice dialing service. In addition, controller 5 controls the operations of speech analyzer 6 that analyzes voice and converts the voice into speech characteristic parameters, speech collator 7, speech answering part 8, PB receiver 9 that receives DTMF signals, and database 10. The aforementioned controller 5, speech analyzer 6, speech collator 7, speech answering part 8, PB receiver 9, and database 10 comprise the voice dialing service device.

In this embodiment, as shown in FIG. 2, for example, the user identification number, referral/update password, destination name (password), and telephone number data are registered in aforementioned database 10. The aforementioned destination name is arbitrary, as long as it is registered in advance. For example, the destination name may be the nickname of the other party (e.g., "dad", "Mr. Kikuta", or "home") or a number. The aforementioned user identification number may also be used for billing.

Next, the invention, the dial-less calling device, uses a card such as the ones shown in FIGS. 3A and 3B, or in essence voice dial card 20. As shown in FIG. 3A, on an area 20a, recorded with magnetism, etc., on the right edge of voice dial card 20 are data for dial-less calling, or in essence the data for accessing the dial-less calling in voice dialing service (e.g., 00XY) (access number) and the user identification number. A subscriber number, etc., may be used as this user identification number. On the other hand, as shown in FIG. 3B, recorded on an area 20b, the left edge of voice dial card 20, are the referral/update data for accessing the service for the registration, deletion, revision, etc., of the destination data (e.g., 00X'Y')(access number) and the aforementioned user identification number.

Therefore, when the user holds voice dial card 20 in his hand and inserts right edge 20a into card reader 1a in direction p, card reader 1a will read the dial-less calling data. On the other hand, when the user inserts left edge 20b of voice dial card 20 into card reader 1a in direction p', card reader 1a will read the dial-less referral/update data.

Next, the operations of the embodiment are explained using the flow chart in FIG. 4. At step S1, a judgement is made on whether voice dial card 20 has been inserted into card reader 1a in the public telephone. If the judgement is positive, then the access number read by aforementioned card reader 1a is automatically originated from telephone 1. At step S2, aforementioned switch controller 4 receives aforementioned access number. Then, at step S3, a judgement is made on whether the access number is a dial-less calling number, or in essence 00XY, or a dial-less referral/ update number, or in essence 00X'Y'. If the judgement is that the access number is a dial-less calling number, then the system proceeds to ① in FIG. 5. If the judgement is that the access number is a dial-less referral/update number, then the system proceeds to ② in FIG. 6.

At step S4 in FIG. 5, switch controller 4 controls switch 3 to connect the line over which a call was originated to the dial-less calling number, then receives the user identification number. At step S5, a judgement is made on whether the user identification number is registered as a number eligible to receive dial-less calling. To be more specific, the judgement is made by analyzing the user identification number received by aforementioned PB receiver 9 since, as an example, the aforementioned user identification number is originated in the form of DTMF signals, followed by controller 5 searching the user list registered in database 10 according to the analyzed user number. If, based on the search, the judgement at step S5 is negative, the system proceeds to step S6, and a voice guidance telling the caller that he cannot use the voice dialing service is sent from speech answering part 8, then the line is later disconnected. On the other hand, if the judgement at step S5 is positive, then the system proceeds to step S7.

At step S7, the user identification number is temporarily stored in memory of controller 5, which is not shown in the drawing. Next, the system proceeds to step S8, where speech answering part 8 provides the caller with a message requesting him to speak the destination name to which he wishes to place the call. At step S9, the destination name spoken by the caller is received. Speech analyzer 6 then analyzes the received destination name, converts it into speech characteristic parameters, then temporarily stores the voice characteristic parameters in memory.

At step S10, the destination telephone number is searched in database 10 using the aforementioned user identification number and the speech characteristic parameters of the destination name. Next, at step S1, a judgement is made on whether the destination name is registered in database 10. This judgement is made by speech collator 7. If the judgement is positive, the system proceeds to step S13 and reads the corresponding destination telephone number from database 10. When the telephone number is sent from controller 5 to switch controller 4, corresponding switch controller 4 controls switch 3 so the line is connected to the destination corresponding to the telephone number. As a result, the caller is able to place a call to the destination from a public telephone without ever performing a dialing operation.

If the judgement is negative at aforementioned step S11, the system proceeds to step S12, where a judgement is made on whether this negative judgement was made consecutively for a number of times, for example, three times. If this judgement is negative, the system returns to step S8, and requests the caller to speak the destination name one more time. Then, the system repeats the processes described under steps S9 to S11. If, as a result of these processes, the judgement at step S11 becomes positive, then the system proceeds to step S13 and makes a connection to the destination according to the destination telephone number. On the other hand, if the judgement at aforementioned step S11 is negative, then the judgement at step S12 is made again. If, as a result of repeating the processes described above, the judgement at step S12 is positive, then controller 5 sends to switch controller 4 a command to disconnect the line, then performs a line disconnection process.

As described above, according to this embodiment, as this invention is capable of sending user identification number from a public telephone, it can provide a user with the same voice dial when the user is calling from a public telephone as when he is calling from a pre-registered telephone at home, office, etc. In addition, in this embodiment example, the dial-less calling device is called by sending an access number from a card, then the user identification number is sent from the card before voice dialing is enabled. Therefore, a user is able to call the destination without ever dialing the public telephone. As a result, the user no longer needs to look up the destination telephone number in his address book, etc., nor does he need to dial the telephone number. Consequently, this invention can greatly improve convenience.

Next, FIGS. 6 to 9 are used to explain the dial-less referral/update number operations at step S3 in FIG. 4, or in essence the operations of registration, updating, deletion, and referral of the destination data (destination name and the corresponding telephone number) in FIG. 2.

Figure 6:
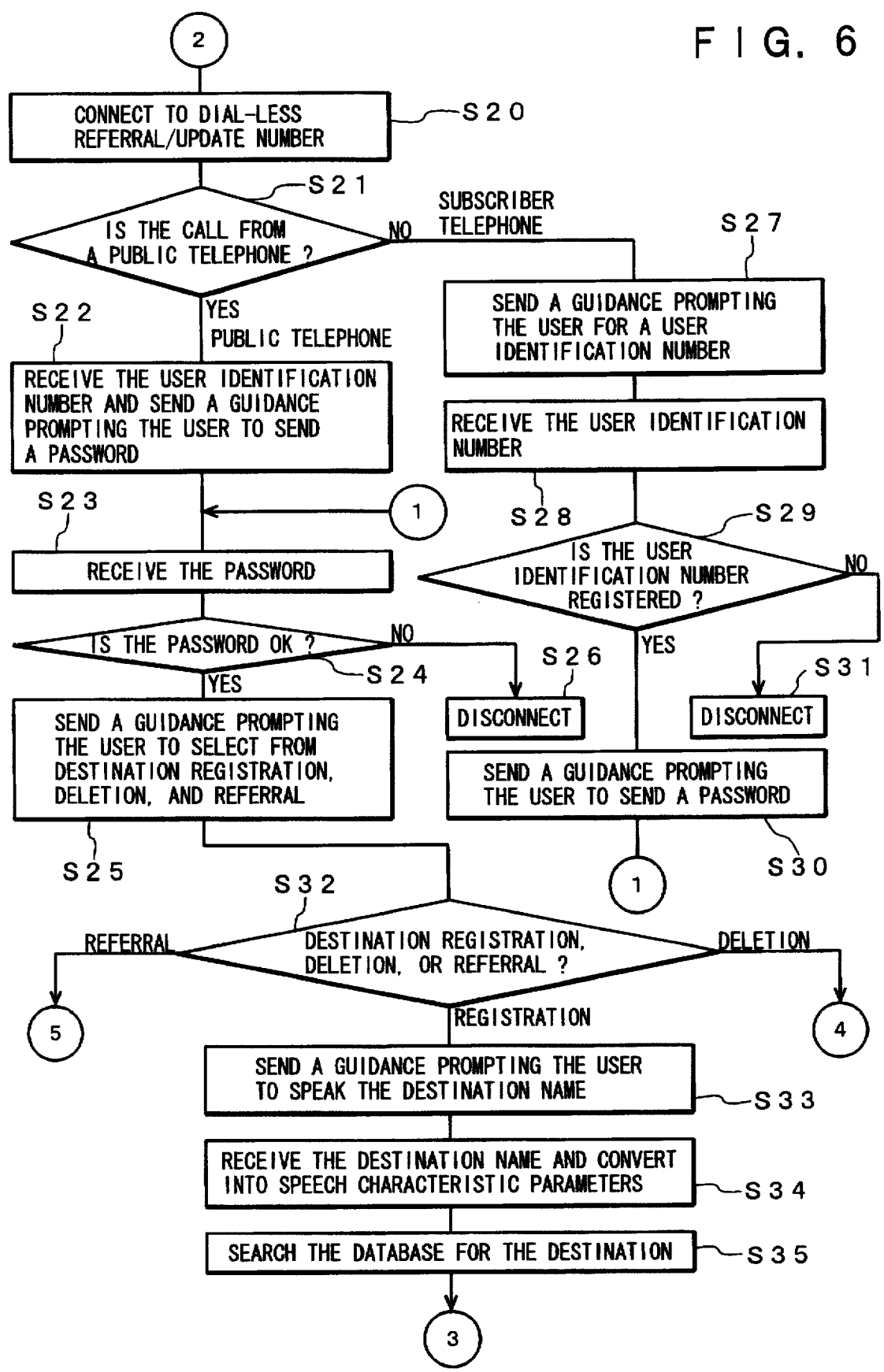
FIG. 6 is a flow chart that explains the dial-less referral/update operations.
Figure 7:
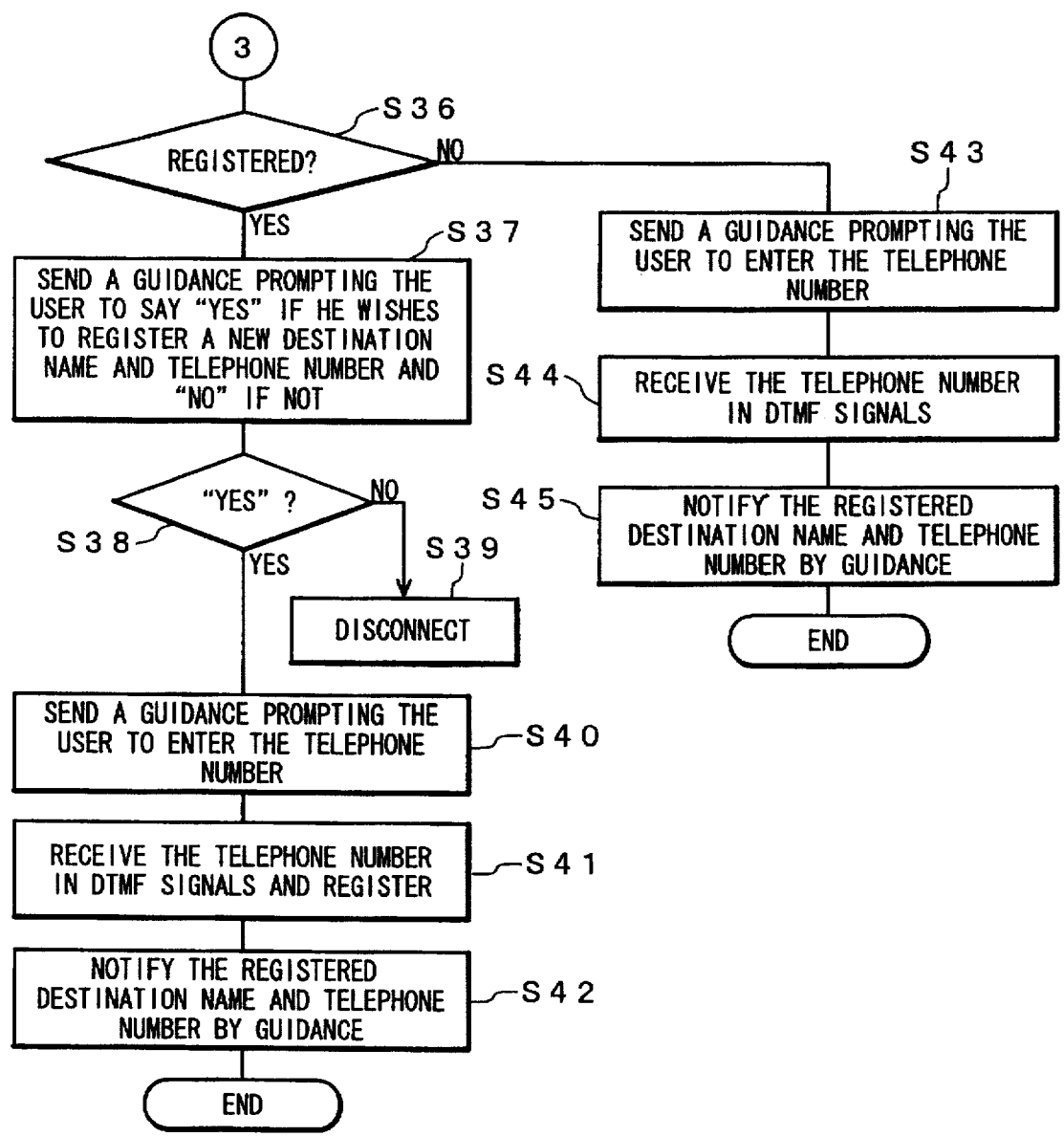
FIG. 7 is a flow chart that explains the destination registration operation.

At step S20 in FIG. 6, the aforementioned line is connected to the dial-less referral/update number by switch 3. At step S21, a judgement is made on whether the call was originated from a public telephone. This judgement can be made, for example, by using the calling party category (CPC) of initial address message (IAM) signal. If the call is judged to have been originated from a public telephone, the system proceeds to step S22, and if the call is judged to have been originated from a subscriber telephone, the system proceeds to step S27.

At step S22, the system receives the user identification number, and sends a guidance requesting the caller for the transmission of a password. If the caller, in response, enters the password using the touch-tone buttons, PB receiver 9 receives the password at step S23. At step S24, a judgement is made on whether the password is correct. If it is correct, the system proceeds to step S25, and sends a guidance to the caller to select destination registration, deletion, or referral. The caller responds by voice in response to this guidance.

At step S21, if the system judges the calling telephone to be a subscriber telephone, it proceeds to step S27 and sends a guidance prompting the user for a user identification number. At step S28, the system receives the user identification number entered by the caller and, at step 29, it judges whether the user identification number is already registered. If this judgement is positive, the system proceeds to step S30, where it sends a guidance prompting the user to enter a password. On the other hand, if the judgement at aforementioned step S29 is negative, the system proceeds to step S31 and disconnects the line. After step S30, the system proceeds to aforementioned step S23.

At step S32, a judgement is made on whether the caller selected destination registration, deletion, or referral. If registration had been selected, the system proceeds to step S33 and sends a guidance prompting the user to speak the destination name. After the destination name is received from the caller by voice, aforementioned speech analyzer 6 analyzes the voice and converts the destination name into speech characteristic parameters. At step S35, the system searches database 10 based on the destination name, then proceeds to step S36 in FIG. 7.

At step S36, speech collator 7 judges whether the aforementioned destination name is already registered. If the destination name is registered, the system proceeds to step S37, and sends a guidance prompting the caller to say "yes" if he wishes to register a new telephone number to the destination name list and say "no" if not. At step S38, a judgement is made on whether the response from the caller was "yes." If the judgement is that the response was "no," the system disconnects the line. On the other hand, if the judgement is that the response was "yes," the system proceeds to step S40 and sends a guidance prompting the caller to enter the telephone number. At step S41, the system receives and registers the telephone number entered by the caller. At step S42, the registered destination name and telephone number are sent from speech answering part 8 to notify the caller.

On the other hand, if the judgement is negative at step S36, the system proceeds to step S43 and sends a guidance prompting the caller to enter the telephone number. At step S44, the system receives the telephone number entered by the caller and at step S45, speech answering part 8 sends the registered destination name and telephone number to notify the caller.

According to this invention, with the operations above, a caller can register new destination names and corresponding telephone numbers to the destination list of the aforementioned database 10. The caller can also revise telephone numbers that are already registered in the destination list.

Figure 8:
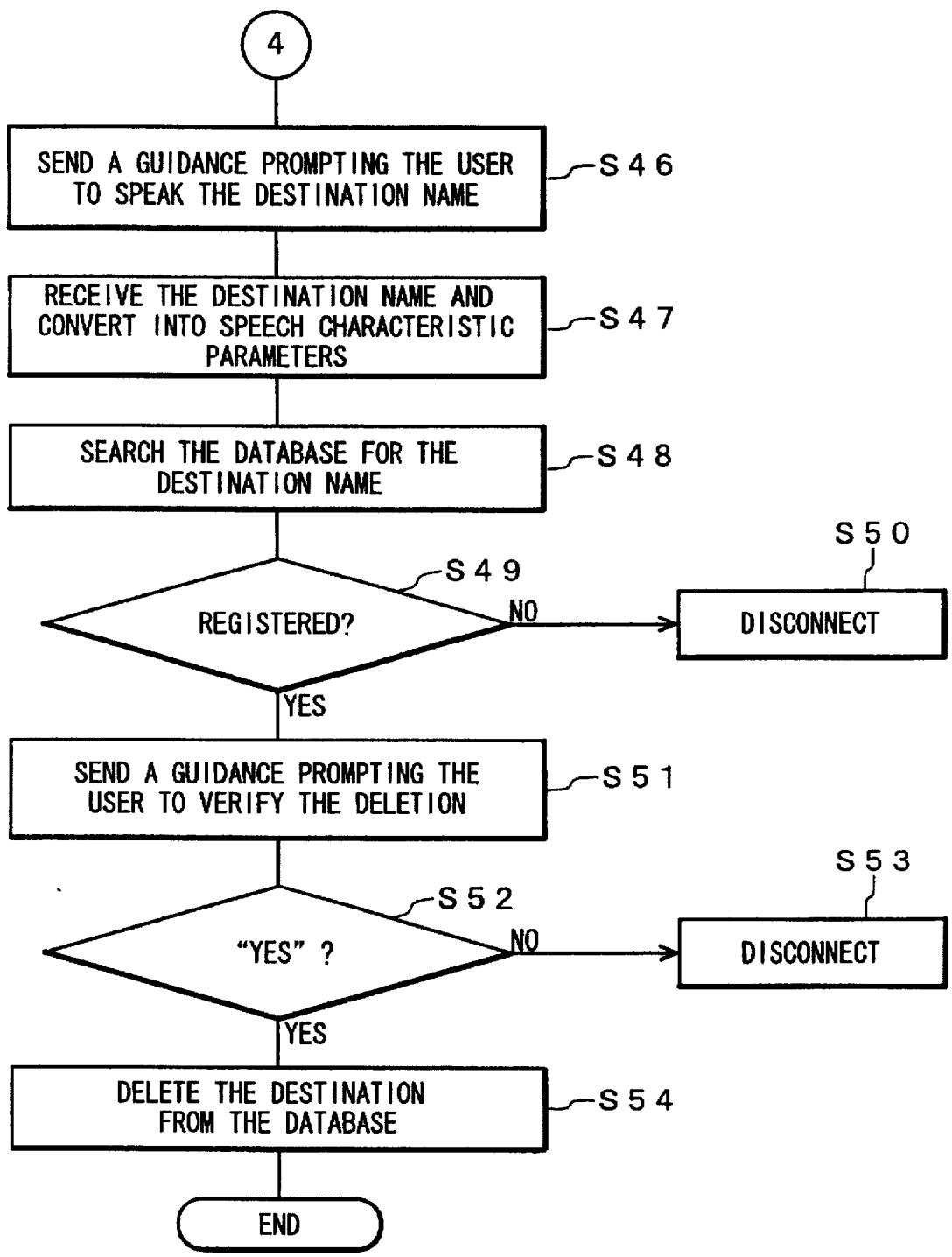
FIG. 8 is a flow chart that explains the data deletion operation.

Next, FIG. 8 is used to explain the operations when deletion is selected at step S32 in FIG. 6.

At step S46, the system sends a guidance prompting the caller to speak the destination name to be deleted. At step S47, the system receives the destination name spoken by the caller. Speech analyzer 6 then analyzes the received destination name and converts it into speech characteristic parameters. At step S48, the destination name is searched in the database using the speech characteristic parameters. If the aforementioned destination name is judged not to be registered as a result of this search, the system proceeds to step S50 and disconnects the line. On the other hand, if the system finds that the destination name is registered, it proceeds to step S51 and sends a guidance prompting the caller to verify that he wishes to delete the destination name. If the caller responds "yes," the system proceeds to step S54 and deletes the destination name from the database. On the other hand, if the response "yes" is not provided by the caller, the system proceeds to step S53 and disconnects the line. With the operations above, it is possible to delete destination names with a call placed from public telephone.

Figure 9:
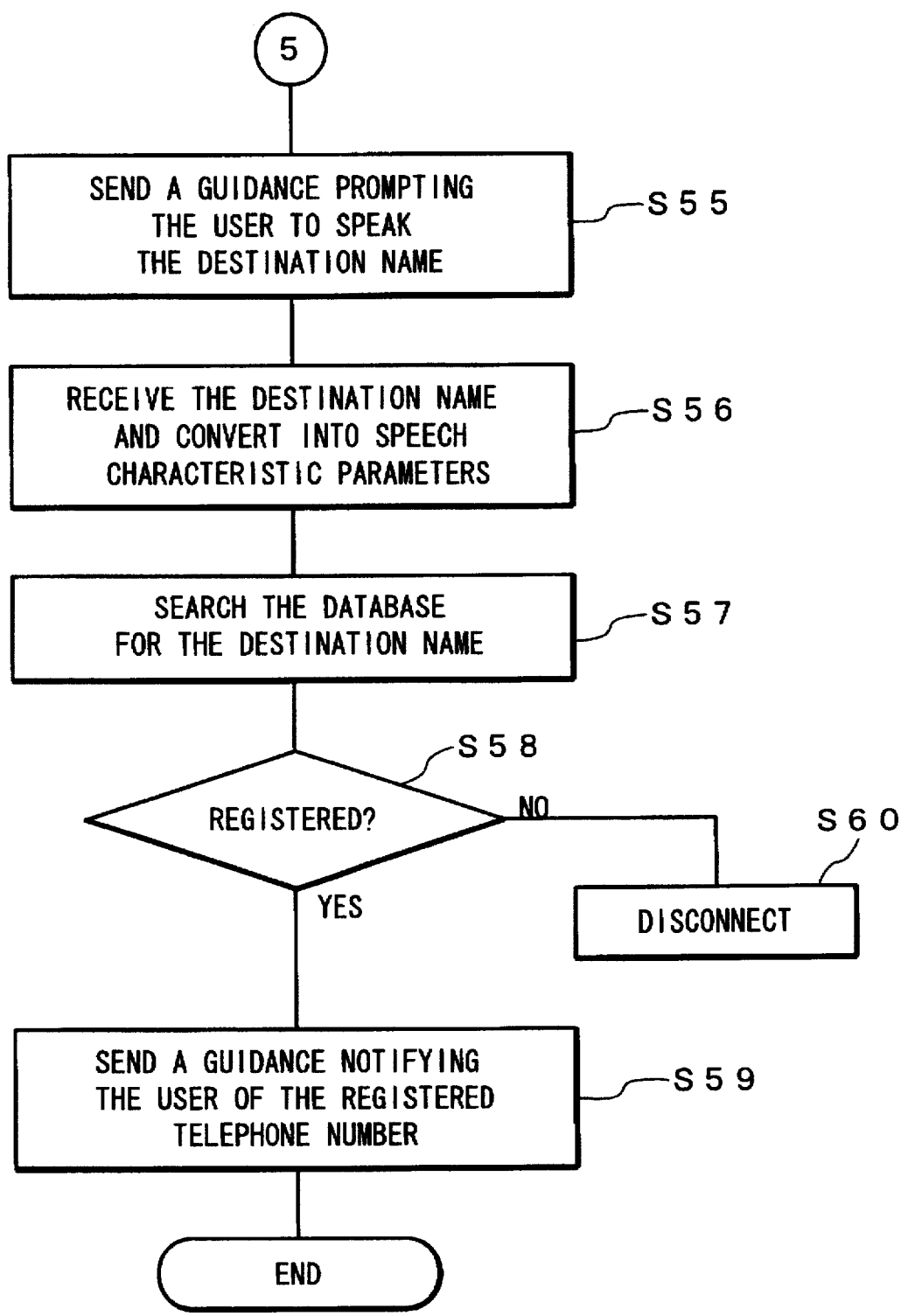
FIG. 9 is a flow chart that explains the data referral operation.

Next, FIG. 9 is used to explain the operations when referral is selected at step S32 in FIG. 6.

At step S55, the system sends a guidance prompting the caller to speak the destination name. If the caller provides a response, the system proceeds to step S56, receives the destination name, and converts it into speech characteristic parameters. At step S57, the system searches the database for the destination name. Next, the system proceeds to step S58 and judges whether the destination name is registered in the database. If the judgement is positive, the system proceeds to step S59 and sends the registered telephone number by voice. On the other hand, if the destination name is not registered, the system proceeds to step S60, provides a guidance that the destination name is not registered, then disconnects the line. With the operations above, when a user wishes to verify the contents registered in the database, he can select the refer function to refer to the contents registered in the database.

As is clear from the explanation above, according to this invention, a user can call the destination and speak to the other party without ever dialing the telephone, by inserting one end of one voice dial card into the card reader on a telephone. In addition, the user can register destination names and telephone numbers, or revise, delete, or refer to telephone numbers that are registered in the database, by inserting the other end of the voice dial card into the card reader.

The aforementioned embodiment provided a case where the voice dial card is used to place international calls. This invention is clearly not limited to international calls, however, as it may be used to place calls to domestic parties. In addition, the flow charts in FIGS. 4 to 9 show only examples of the operations of this invention, and may be altered in many ways so as long as such alterations do not affect the original intention of this invention.

As is clear from the explanations above, according to this invention, calls can be originated using a voice dial card on which a user identification number is recorded. Consequently, the invention offers the benefit of being able to perform voice dialing from public telephones. As a result, users can place telephone calls without referring to their address books, etc., for telephone numbers, so the invention offers a great improvement in convenience.

In addition, according to this invention, access numbers for calling the dial-less calling service is recorded on the aforementioned voice dial card. Therefore, a user can put the handset off the hook and have the card reader on the telephone read the access number registered on the card to connect the telephone to the dial-less calling service, then perform using voice the required operations until the destination is called, so the user can call the destination without ever performing a dialing operation.

In addition, according to this invention, the voice dial card can be used from a public telephone to register a new destination name and the corresponding telephone number, or revise or delete existing ones. So, in this respect, too, the invention offers a great improvement in convenience.

What is claimed is:

1. A dial-less calling device, comprising:

a card, registered to which are no less than an access number for calling the dial-less calling service that connects a line to a destination party and a user identification number for identifying a user;

a telephone with a function for reading the access number and the user identification number registered to the card and that automatically calls the access number;

a means of receiving the access number and connecting the telephone;

a database, registered to which are no less than the user identification number, destination names, and the telephone numbers corresponding to the destination names;

a means of searching a telephone number based on the user identification number and a destination name spoken by the user; and a means of connecting the line to the destination party using the searched telephone number.

2. The dial-less calling device in claim 1, wherein the dial-less calling device is such that the telephone is a public telephone.

3. The dial-less calling device in claim 1, wherein the dial-less calling device is such that an access number for calling the dial-less calling service and a user identification number for identifying the user are registered to one end of the card and an access number for calling a service to register, refer to, or change destination names and corresponding telephone numbers registered in the database and a user identification number for identifying the user are registered to other end of the card.

4. The dial-less calling device in claim 1, wherein a judgement means of judging whether the user identification number is registered and a means of providing the dial-less calling service if the user identification number is judged to be registered by the judgement means and disconnecting the line if the user identification number is judged not to be registered comprising the dial-less calling device.

5. The dial-less calling device in claim 3, wherein a judgement means of judging whether the user identification number is registered and a means of providing the dial-less calling service if the user identification number is judged to be registered by the judgement means and disconnecting the line if the user identification number is judged not to be registered comprising the dial-less calling device.

6. The dial-less calling device in claim 1, wherein the dial-less calling device is such that the user identification number is a subscriber number.

7. The dial-less calling device in claim 2, wherein the dial-less calling device is such that the user identification number is a subscriber number.

8. The dial-less calling device in claim 3, wherein the dial-less calling device is such that the user identification number is a subscriber number.

9. The dial-less calling device in claim 4, wherein the dial-less calling device is such that the user identification number is a subscriber number.

* * * * *